July 12, 1927.
G. M. TURNER
TRUCK
Filed May 7, 1923
1,635,198
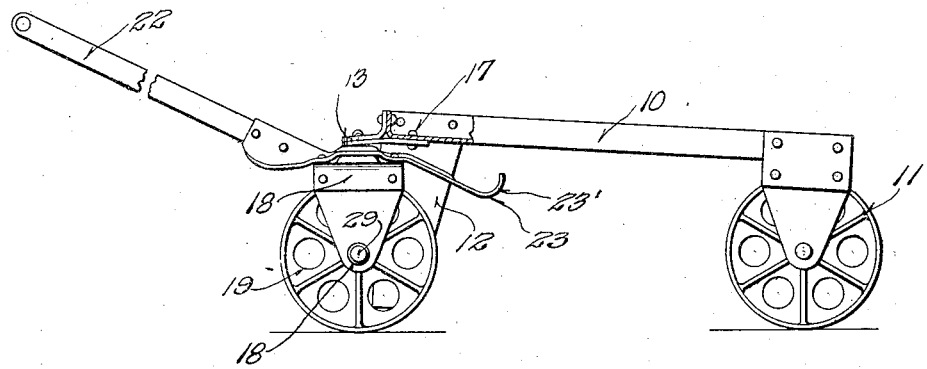
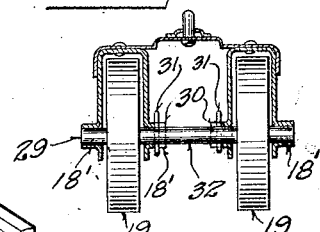
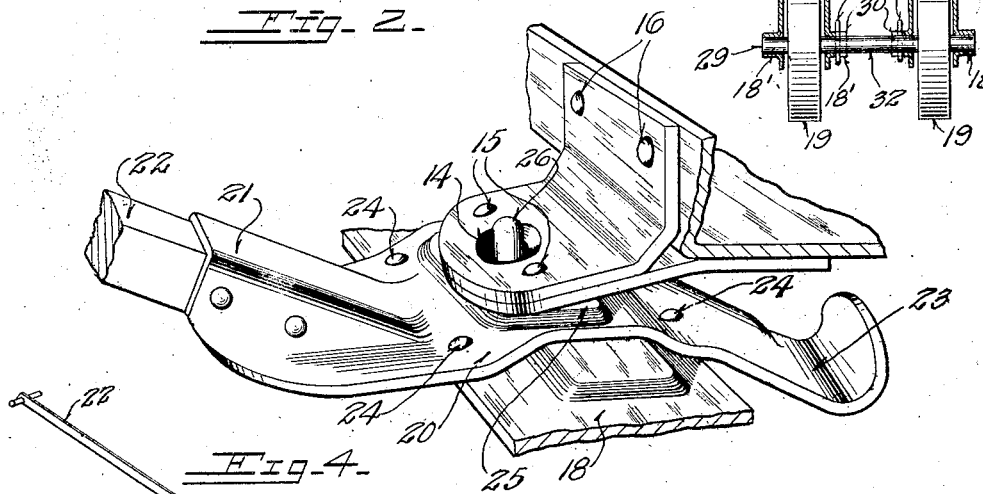
INVENTOR.
Giles M. Turner.
BY
Morsell, Keeney & Morsell
ATTORNEYS Patented July 12, 1927.

1,635,198

UNITED STATES PATENT OFFICE.

GILES M. TURNER, OF MILWAUKEE, WISCONSIN.

TRUCK.

Application filed May 7, 1923. Serial No. 637,229.

This invention relates to improvements in trucks, and particularly to trucks for shop use having a portion of the device in the form of a jack truck which may be employed to raise the front portion of the truck from off the floor preparatory to moving the same.

One of the objects of this invention is to so construct the engaging portions of the truck body and jack truck that a bearing surface or support adjacent the pivotal connection between these parts may be provided, thus enabling the truck to be easily guided by turning the jack truck, and furthermore eliminating vibrations to the handle of the jack truck when the device is moving over rough or uneven surfaces.

The invention further consists in the novel combination, construction and arrangements of parts as will be made more apparent as the description proceeds, especially when considered in connection with the accompanying drawings wherein;

Figure 1 is a side elevation, partly in section, of a truck constructed in accordance with this invention;

Fig. 2 is an enlarged fragmentary perspective view of the engaging portions of the jack truck and truck body.

Fig. 3 is a central vertical sectional view of the jack truck; and

Fig. 4 is a perspective view of the jack truck showing its use in moving a tote box.

Referring now more particularly to the drawings wherein like reference characters indicate like parts, it will be noted that there is provided a truck body 10, which may be of any desired construction, having supported at the rear end thereof wheels 11. Legs 12, arranged at the front of the truck body, support the front end of the truck body when disconnected from the jack truck. The front end of the truck body has secured thereto a coupling tongue 13, apertured as at 14, for pivotal engagement with a coupling pin yet to be described.

To insure rigidity and strength, the coupling tongue is preferably formed in two parts, riveted together as at 15, the upper portion of the tongue being secured to the truck body as at 16 and the lower portion thereof being secured to the truck body as at 17.

The jack truck consists of a wheel carrying member 18, on which there is mounted a pair of wheels 19. Arranged transversely of the wheel carrying member 18 is a plate member 20, terminating at one end in a socket 21, adapted to receive a handle 22, and at the other end in a supporting leg 23. The plate member 20 is securely fastened, preferably by rivets 24, to the wheel carrying member 18.

In order to provide a bearing surface upon which the coupling tongue 13 may bear, the plate-like member 20 is provided with a rib-like bearing surface 25, formed by upsetting the plate member 20 from the bottom thereof, this upsetting producing a flat bearing surface in the vicinity of the coupling pin 26, which is adapted to project through the aperture 14 of the coupling tongue.

It will be noted that the coupling tongue is preferably inclined downwardly to a slight extent, and by reason of this downward inclination and the flat raised bearing surface 25, a flat engagement between the coupling tongue and the jack truck is provided in front of the point of pivotal connection, or in other words, in front of the vertical plane of the wheel axle of the jack truck.

By providing these flat co-operating bearing surfaces, the jack truck wheels are prevented from lifting off the floor when the truck is turned. Furthermore, as will be obvious, the liability of the handle flying upwardly when released by the operator, is also eliminated and the tendency to tip over when turning corners is avoided. It has been found that this bearing connection between the truck body and jack truck in advance of the point of pivotal connection eliminates, to a great extent, vibrations occasioned to the handle when the truck is moving over uneven or rough surfaces or floors.

In use, one jack truck may be employed for several truck bodies, the truck bodies being normally supported by the wheels 11 and legs 12. When it is desired to move one of the truck bodies, the jack truck is inserted under the front end thereof to raise the front end off the floor and to cause an engagement of the coupling pin 26 with the aperture 14 of the coupling tongue. Thereupon the truck body may be moved as desired.

When the jack truck is disconnected from the truck body, it may be left in an upright position, the handle 22 being supported substantially vertically by the wheels 19, and leg 23. In this way one or more of the jack trucks may be stored, occupying, during storage, a minimum amount of space.

The jack truck may also be used to move tote boxes as shown in Fig. 4, by inserting the hooked end 23' of the supporting leg 23 through the handle 27 of the tote box 28 in the manner shown. The hooked end also serves to hold the handle off the floor by engaging the bottom portion of the truck body.

Attention is directed to the manner of holding the shaft 29 in the wheel carrying member 18 by forming outwardly embossed bearing parts 18', the inner ones of which are provided with slots 30 for receiving cotter pins 31 which extend through the shaft and hold said shaft against longitudinal and rotative movement in the depending portions of said member. The space 32 between these bearings permits the operator to place his foot on the shaft and easily guide the truck into engagement with the truck body or box to be moved.

Having thus described the invention, what is claimed is:

1. In a truck construction of the class described, a truck body, a coupling tongue secured to the forward end of said body, said coupling tongue comprising a pair of plates rigidly secured together throughout a portion of their length and bent to form an inclined bearing surface, said plates being divided throughout the remainder of their length to form an angular portion adapted to be secured to the truck body, and a wheeled jack truck, said jack truck being formed with means for pivotally engaging the bearing surface on the said tongue, said engaging bearing surfaces being arranged wholly forward of the centers of the wheels of said jack truck.

2. A truck jack, comprising a supporting member having an upstanding coupling tongue and downwardly depending U-shaped portions the arms of which are provided with outwardly projecting bearings, the inner ones of which are formed with slots, spaced apart wheels between said depending portions, a shaft extending through the depending portions and the wheels, pins extending through the bearing slots and the shaft to prevent longitudinal and rotative movement of the shaft, a handle projecting forwardly from the supporting member, and a hook like projection extending rearwardly from said supporting member for engagement with a receptacle and for supporting the jack in upright position.

In testimony whereof, I affix my signature.

GILES M. TURNER.